William H. Rodden's
Impts in Tines or Prongs, & Hay and other Forks.

No. 120,458.           Patented Oct. 31, 1871.

Witnesses.  
Jno. S. Thornton  
Wm. Ventz

Inventor:  
William H. Rodden  
By his Atty.  
Charles A. Rogers

UNITED STATES PATENT OFFICE.

WILLIAM H. RODDEN, OF TORONTO, CANADA.

IMPROVEMENT IN FORK-TINES.

Specification forming part of Letters Patent No. 120,458, dated October 31, 1871.

*To all whom it may concern:*

Be it known that I, WILLIAM H. RODDEN, of the city of Toronto, in the county of York, Province of Ontario and Dominion of Canada, have invented new and useful Improvements in Tines or Prongs of Hay and other Forks; and I do hereby declare that the following is a full and exact description thereof, reference being had to the accompanying drawing forming a part of this specification, and to the letters of reference marked thereon.

Letters Patent have been obtained in Canada for this invention, which said Letters Patent bear date the 7th day of February, 1871.

My invention relates to an improvement in the form or shape of the tines or prongs of hay, straw, manure, and other forks; and its object is to construct the same in such a manner and of such form or shape that they shall be more perfect in their operation and may be made of greater strength with the same weight of metal than has hitherto been attained in any of those hitherto known or used. My invention consists in the novel and peculiar form or shape in which I make the tines or prongs of the fork. They are made comparatively full and rounded on their upper or lifting side, and are tapered down to a thin edge on their lower or under side, by which means the advantages both of the oval tine and also of the round tine are secured, while the defects found to exist in each of these forms are avoided.

To enable others skilled in the art to make and use my improvement, I will proceed more particularly to describe the same.

Figure 1:
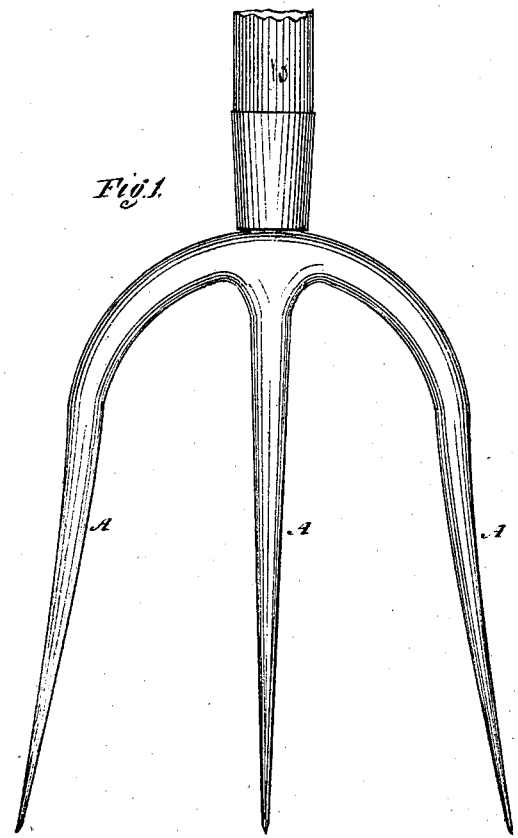
Figure 2:
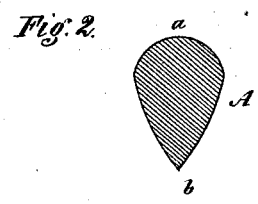

Figure 1 represents a front elevation of a fork with my improved tines. Fig. 2 is a transverse section of one of the tines, to show the form or shape of my improved tine.

A A A represent the tines or prongs, which may be made of suitable metal, and of such dimensions and strength as may be adapted for the kind of work to which they are to be applied, and may be secured to the handle B in any suitable and well-known manner. These tines or prongs are made full and rounded on their upper side, as seen at *a*, Fig. 2, while on their under or lower side they are tapered to a thin edge, as seen at *b*.

By means of this peculiar form or shape of the tine or prong I obtain several important advantages. In the first place, the rounded upper side presents a larger bearing surface to the load or material to be lifted than the oval tine, which secures an easy delivery of the load, as the rounded upper surface of the tine does not cut into or break the fiber of the straw or other material. In this respect my improved tine possesses an important advantage over the oval-shaped tine, which presents a thin edge to the lift and breaks the fiber of the straw or other similar material, causing it to bind on the prong, so that it requires more force to pitch off the load. The rounded upper side also imparts more firmness and strength to resist lateral strain, which is especially important near the point, where the oval tine becomes too thin and weak if perfectly tapered throughout. In the second place, the tapering of the under or lower side imparts greater strength to resist the vertical pressure of the load than does the round tine, so that a smaller quantity of metal is required to make a tine equal in strength to the round tine. Again, my improved form of tine admits of a more perfect tapering from heel to point than is possible in the oval tine without its point becoming too weak, as stated above, and less power is required to withdraw the fork from the load. It will, therefore, be seen that in my improved tine I secure the advantages both of the round tine, which are easy delivery and lateral strength, and also those of the oval tine, which are firmness and strength to resist or bear vertical pressure, all of which advantages are secured with the least possible weight of material or metal.

Having thus described my invention, what I claim as new, and desire to secure by Letters Patent of the United States, is—

A fork tine having the upper half cylindrical and the lower half an acute parabola, as herein shown and described.

WM. H. RODDEN.

Witnesses:
  THOS. J. WILKIE,
  A. CHRISTIE.

(77)